May 2, 1950  M. DAVIS  2,506,347
AUTOMATIC CAMERA FOCUSING DEVICE
Filed Dec. 4, 1946  4 Sheets-Sheet 3
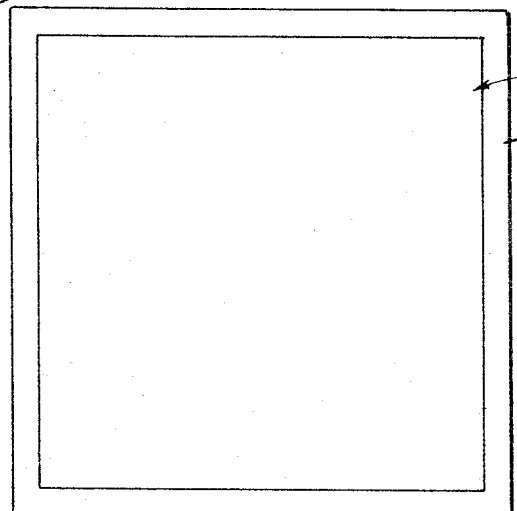
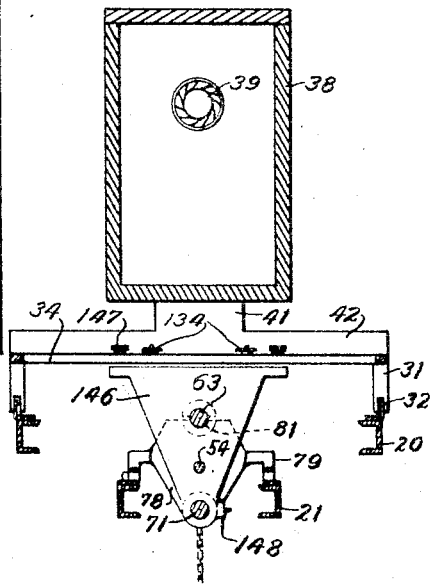
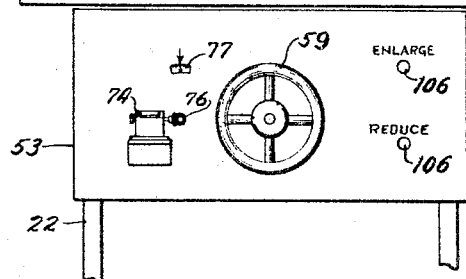
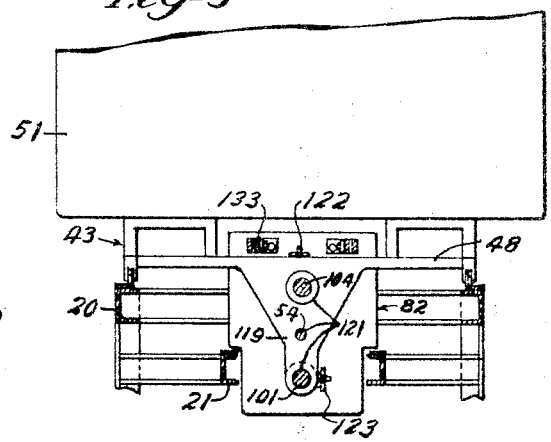
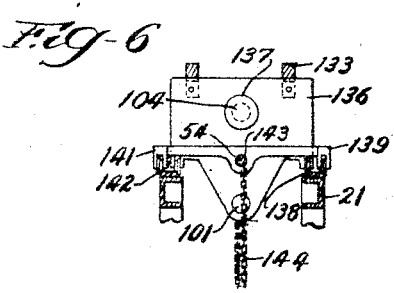
Inventor
Meyer Davis
By: Mann and Brown May 2, 1950 M. DAVIS 2,506,347
AUTOMATIC CAMERA FOCUSING DEVICE
Filed Dec. 4, 1946 4 Sheets-Sheet 4
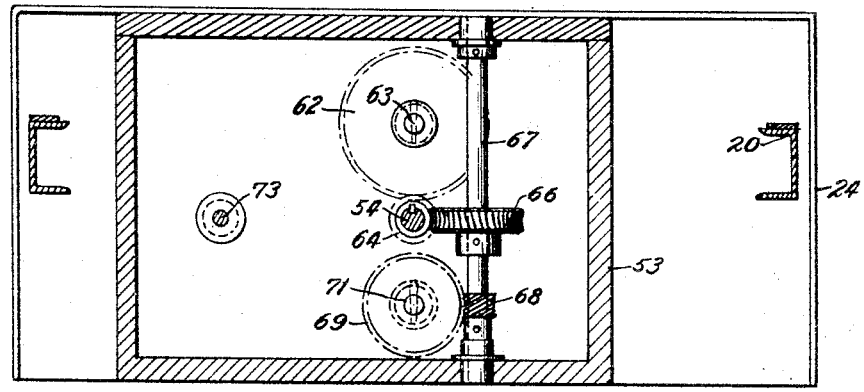
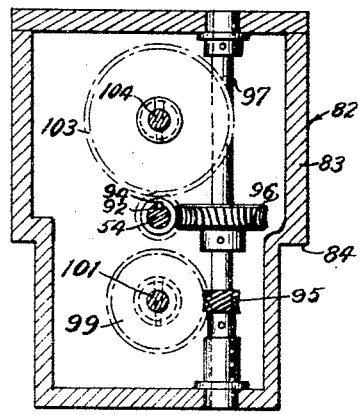
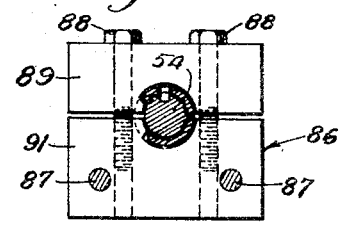
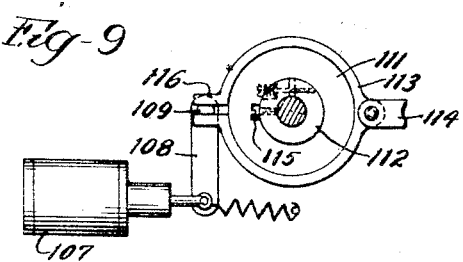
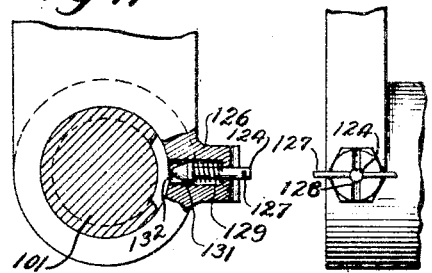
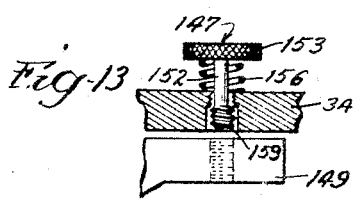
Inventor
Meyer Davis.
By:- Mann and Brown
Attys.

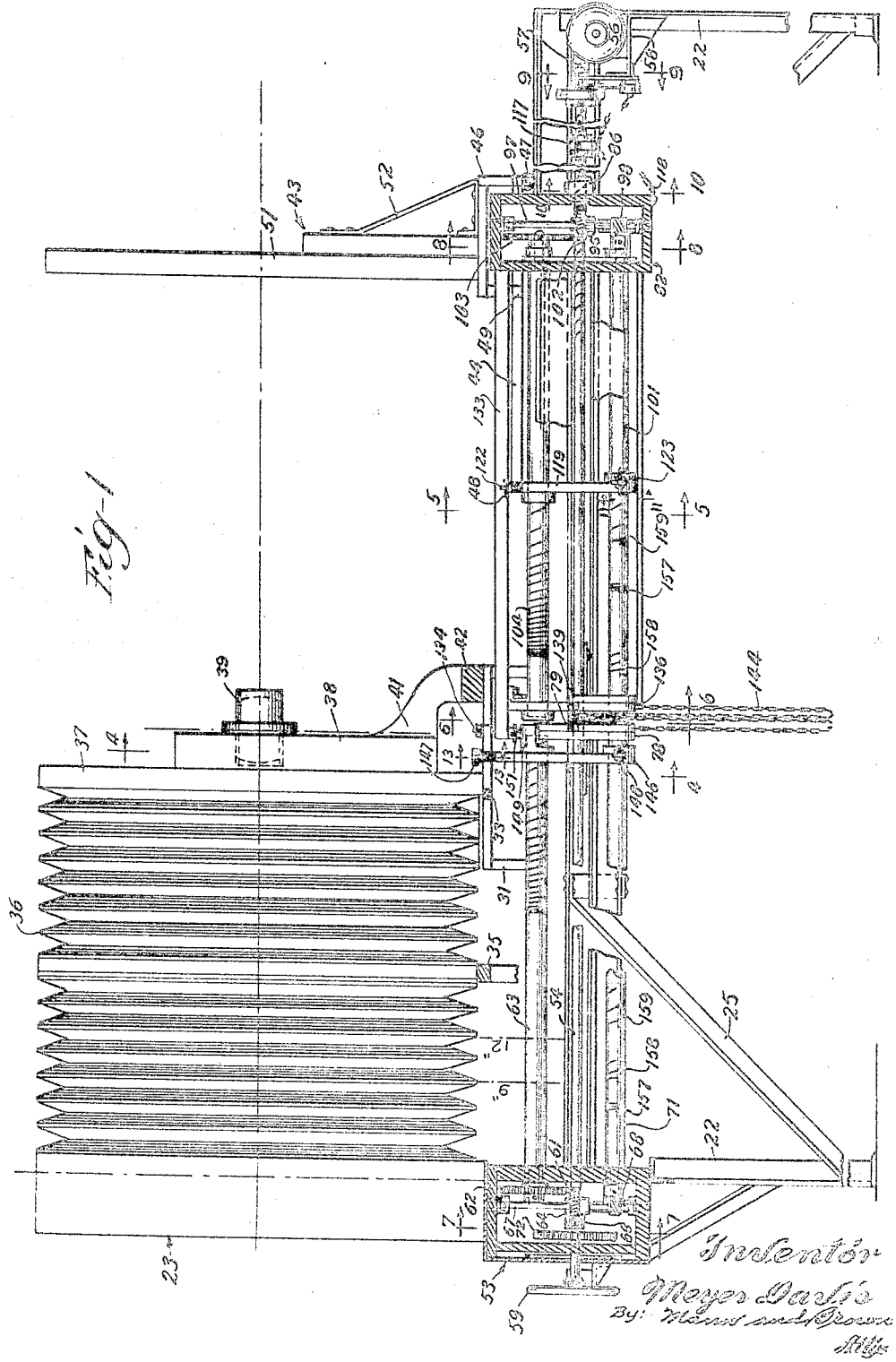

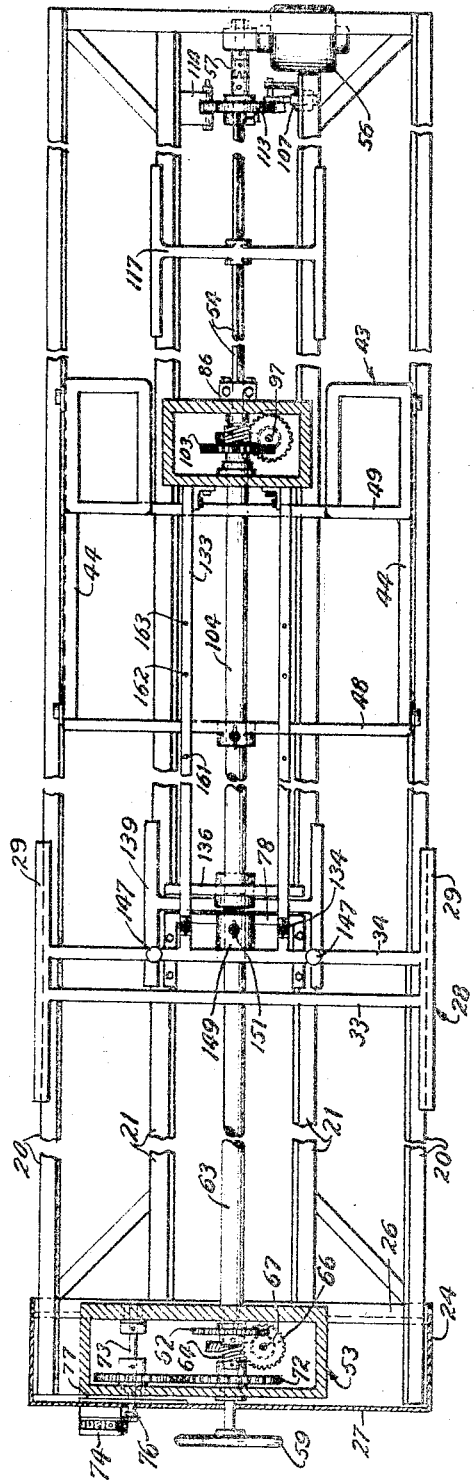

Patented May 2, 1950

2,506,347

UNITED STATES PATENT OFFICE 2,506,347

AUTOMATIC CAMERA FOCUSING DEVICE

Meyer Davis, Chicago, Ill.

Application December 4, 1946, Serial No. 713,982

8 Claims. (Cl. 88—24)

My invention is directed to cameras, and particularly to process cameras of the type commercially employed to produce clear and accurate enlargements or reductions of an image.

Formulas for accurately determining the distances which must exist between the negative, lens and the image elements of commercial process cameras to obtain satisfactory enlargements or reductions of the image on the negative have been carefully developed and applied in the production of cameras of many types. It has long been obvious that these relationships must be maintained with the highest order of accuracy if good photographs are to be expected. Various means for mechanically maintaining the requisite spacing between the negative, lens and image elements have been proposed but in general these have not been adopted for construction with sufficient accuracy to permit their use in commercial process camera work. The spacings between the elements of process cameras, therefore, are usually set for each picture by skilled photographers who calculate closely the necessary distances.

One of the important objects of my invention is to provide a commercial process camera, or the like, which incorporates easily operated focusing means for maintaining with a high order of precision the required spacings between the lens, negative and image elements over a wide range of settings for enlargement or reduction without requiring the independent adjustment of the spacings between any of the elements within the range of the lens employed and which may therefore be satisfactorily operated by workmen of relatively limited skill.

Other important objects include the provision of such a camera in which lenses of various focal lengths may be interchangeably employed with only a single initial change of spacing between the major camera elements and in which the distances necessary for accurate focusing may be varied by the operation of a single remotely controlled motor, or the like.

Other important objects and advantages will become apparent from the following specification and from the drawings in which:

Figure 1 is a partially sectioned side view of a camera incorporating my focusing device;

Figure 2 is a diagrammatic top view of a camera incorporating my focusing device;

Figure 3 is an end view of my camera;

Figure 4 is a partial cross section taken along the lines 4—4 of Figure 1;

Figure 5 is a partial cross section taken along the lines 5—5 of Figure 1;

Figure 6 is a partial cross section taken along the lines 6—6 of Figure 1;

Figure 7 is a partial cross section taken along the lines 7—7 of Figure 1;

Figure 8 is a partial cross section taken along the lines 8—8 of Figure 1;

Figure 9 is a partial cross section taken along the lines 9—9 of Figure 1;

Figure 10 is a partial cross section taken along the lines 10—10 of Figure 1;

Figure 11 is a cross section taken along the lines 11—11 of Figure 1;

Figure 12 is a side view of the section illustrated in Figure 11; and

Figure 13 is a cross section taken along the lines 13—13 of Figure 1.

In the following specification and claims various terms have been applied to specific parts or sub-assemblies which for clarity are herein defined as follows:

*Lead screw.*—A constant pitch screw disposed substantially parallel to the optical axis of the camera.

*Variable screw or variable pitch screw.*—A screw having threads formed thereon in which the distance or pitch between successive turns of the threads progressively increases or decreases.

*Negative holder.*—A device for supporting a light-sensitive media upon which an image or copy is to be reproduced.

*Copy holder.*—A device for supporting the image or copy to be reproduced on a negative.

*Starting position.*—The position of the lens and copy holder relative to the negative holder in which the image is reproduced on the negative without enlargement or reduction, the distance between the lens and the copy holder being equal to the distance between the lens and the negative holder which is equal to twice the focal length of the lens employed.

Briefly, my camera includes inner and outer tracks normal to a fixed negative holder. A lead screw extends outwardly from the negative holder parallel to and substantially coextensive with the tracks and engages a gear box which is moved along the tracks by the lead screw. A movable variable screw is journaled in the gear box and connected by suitable gears to the lead screw in such manner that the variable screw is rotated in coordination with the constant pitch screw as the gear box is moved. A copy holder, mounted on the tracks, is driven toward or away from the negative holder by the movable variable screw journaled in the movable gear box. A fixed variable screw is journaled in a fixed gear box which is usually mounted on the frame of the negative holder and is also driven by gears from the constant pitch screw. Preferably the two variable pitch screws are disposed in axial alignment.

To enlarge the image or copy, a lens carrier, mounted for movement along the track, is moved to starting position and engaged by the movable gear box by a retractable pin. The lead screw is then rotated, as by a motor, until the desired degree of enlargement is obtained, which may be indicated by a dial on the fixed gear box. Rotation of the lead screw moves the lens, the gear box and the movable variable screw away from the negative holder at a uniform rate, but the copy holder, which is driven by the movable variable screw, moves at the lower nonlinear rate since the threads of the variable screw are such that the copy holder approaches the lens as the lens moves away from the negative holder.

If it is desired to reduce the image, the lens carrier and the copy holder are returned to starting position, the lens carrier disconnected from the movable gear box and engaged to the fixed variable screw. Rotation of the lead screw, therefore, drives the lens carrier and lens toward the negative at a predetermined nonlinear rate while the copy holder is moved away from the negative holder and lens in the manner previously described. Thus the compound movements produced by this focusing device maintains at all times the proper relationship between the negative holder, the lens, and the copy holder with a very high degree of accuracy so that focusing during enlargement or reduction is unnecessary.

A second set of variable screws, one carried by the movable gear box and the other by the fixed gear box, are provided and have formed on the surface thereof variable pitch threads to which the lens carrier or the copy holder may be engaged if desired. The pitch of these screws is calculated to maintain the proper space between the elements of the camera where lenses having other focal lengths are employed. To change therefore from a lens having a focal length of say 60 cm. to a lens having a focal distance of 17", it is necessary only, having substituted the lens, to engage the pins of the copy holder and the lens carrier with the proper thread on the variable pitch screws or in the case of enlargement, engaging the lens holder to the constant pitch screw. This structure, subsequently described more fully herein, has been found to be highly accurate and permits the rapid production of excellent photographs by an operator of relatively limited skill.

As may be seen in Figures 1 and 2, my camera includes outer tracks 20 parallel to inner tracks 21 which are disposed at a somewhat lower level and parallel to the optical axis of the camera. The tracks 20 and 21 are supported by a suitable framework including legs 22 and support members 25 projecting upwardly from the legs at an angle to the inner tracks 21 or to the inner and outer tracks as desired. A negative holder, generally designated 23, is supported near one end of the tracks 20 and 21 by the legs 22 and may include a frame 24 having an inner panel 26 against which a suitable light-sensitive plate or negative is placed and an outer panel or door 27 through which the negative may be inserted. Preferably the outer tracks 20 extend through the inner panel 26 approximately to the outer panel or door 27 to accommodate a lens carrier, generally designated 28.

The lens carrier 28 includes a pair of parallel members 29 over the outer tracks 20, each of which is provided with downwardly extending legs 31 having suitable wheels 32 which may be flanged to engage the tracks 20. It should be noted that the tracks 20 and 21 are preferably rigid in construction, such as channel members, and suitably shaped to receive the wheels of the various component parts guided in their movement by the track. The lens carrier 28 also includes inner and outer spaced transverse connecting members 33 and 34, respectively.

A bellows 36 is secured at one end to the frame 24 of the negative holder 23 and at the other end to a front plate 37 which is supported by the inner transverse connecting member 33 of the lens carrier 28. A lens plate 38 is secured to the front plate 37 and supports a suitable lens 39. A flange extends outwardly and downwardly from the lens plate 38 and is provided with a transverse cross member 42 which rests on the parallel members 29 of the lens carrier. Since the length of the bellows 36 may be great during enlargement, it is preferably formed in sections which may be inserted or removed as needed, and supported by a suitable rest or rests 35 mounted for movement along the outer tracks 20.

A copy holder, generally designated 43, includes a carrier having spaced parallel members 44 to which downwardly extending legs 46 are attached. Wheels 47, which may be flanged, are journaled to the legs and engage the outer tracks 20. At least inner and outer transverse connecting members 48 and 49, respectively, are provided connecting the parallel members 44 and extending over the inner tracks 21. A suitable board 51 is mounted on or near the outer connecting member 49 and is preferably reinforced by a brace 52.

A fixed gear box 53 is secured to the frame 24 of the negative holder 23 below the bellows 36. A lead screw 54 having threads of constant pitch is journaled in the fixed gear box 53 and extends outwardly parallel to and midway between the inner tracks 21. The outer end of the lead screw 54 is frictionally engaged by a flexible coupling 57, or other suitable means, which is connected to the output shaft of a motor 56 secured by a brace 58 to the outer legs 22. The lead screw 54 may be rotated by operation of the motor 56 or by a disengageable hand wheel 59 slidably journaled in the fixed gear box 53 and provided at its inner end with teeth engaging the end of the screw 54.

A gear 61 in the gear box 53 is secured as by a key, not shown, to lead screw 54 and engages a gear 62 which is secured to the end of an upper fixed variable screw 63 journaled in the fixed gear box 53 and extending outwardly therefrom parallel to and immediately above the lead screw 54. A worm 64 is also secured as by a key to the lead screw 54 and engages a worm gear 66 secured to a cross shaft 67 which is journaled in the fixed gear box 53. A spiral gear is also secured to the cross shaft 67 and engages a corresponding spiral gear 69 which is secured to the end of a lower fixed variable screw 71 journaled in the gear box 53 and extending outwardly therefrom parallel to and below the lead screw 54. A gear 72 is also secured to the lead screw 54 in the gear box 53 and drives a jack shaft 73 which drives a revolution counter 74 through bevel gears 76 and a micrometer dial 77 by means of which the number of revolutions or fractions thereof performed by the lead screw 54 from any given position may be calculated.

The length of the variable screws 63 and 71 should be slightly in excess of twice the focal length of the longest focal length lens to be employed and have formed in their surface threads of variable pitch having a face angle of less than 90°. The outer ends of the variable screws 63 and 71 are journaled in a fixed support which may suitably be connected by transverse arms 79 secured to the inner tracks 21. Both the lead screw 54 and the lower variable screw 71 are journaled in suitable openings extending through the support 78. The upper surface of the support 78 is provided with a semicylindrical notch indicated at 81 which supports the outer end of the upper fixed variable screw 63.

A movable gear box, generally designated 82, includes a housing 83 provided with shoulders 84 disposed approximately midway on the housing 83 which engage inner tracks 21 and is driven along the tracks 21 by a split nut 86 secured to the housing 83 and engaging the lead screw 54. Bolts 88 may be employed to secure the upper half 89 of the split nut 86 to the lower half 91. The housing 83 of the movable gear box 82 is of such height that it will pass freely below the carrier of the copy holder 43. The lead screw 54 is provided with a keyway 92 which extends for a substantial portion of its length outwardly from the starting position of the movable gear box 82. A worm 93 in the movable gear box 82 is provided with a fixed key 94 slidably engaging the keyway 92. The worm 93 engages a worm gear 96 which is secured to a cross shaft 97 journaled in the housing 83. A spiral gear 98 secured to the cross shaft 97 operatively engages a mating spiral gear 99 which is secured to the end of a lower movable variable screw 101 journaled in the housing 83 and extending inwardly therefrom parallel to and below the lead screw 54.

A gear 102 also having a key engaging the keyway 92 is mounted on the lead screw 54 adjacent the worm 93 and drives a gear 103 disposed within the housing 83. The gear 103 is secured to an end of an upper movable variable screw 104 journaled in the housing 83 and extending inwardly therefrom parallel to and above the lead screw 54. The lead screw 54 may, for example, have a right-hand thread and the threads on both the upper and lower fixed and movable variable screws 63, 71, 101 and 104 may also be provided with right-hand threads, the pitch of the threads on variable screw 104 being identical with the pitch of the threads on variable screw 63, and the pitch of the threads on screws 101 and 71 also being identical. Therefore, it is apparent that as the lead screw 54 is rotated, the movable gear box 82 will be moved by the split nut 86 along the tracks 21 and will also rotate the variable screws 71 and 63 through gears in the fixed gear box 53 and the variable screws 101 and 104 through gears in the movable gear box 82. The rotation of the variable screws 101 and 104 is produced while the variable screws are being carried toward or away from the negative holder 23 by the movable gear box 82. It is obviously unnecessary that the entire length of the lead screw be threaded, provided the threads and keyway 92 extend outwardly from the starting position of the movable gear box 82 to the end of the lead screw 54 near the clutch 57.

The motor 56, which engages the lead screw 54 through the flexible coupling 57 may be controlled by suitable button switches 106 mounted on the fixed gear box 53. In order to prevent overrunning, however, a solenoid is connected in series with the motor 56 and actuates a brake lever 108 having a cam 109 secured to one end. The lead screw 54 is provided with a collar 111 clamped to the screw as by a bolt 112, the other end of the coupling 57 being secured to the output shaft of motor 56 by a set screw 115. A spring type brake 113 is pivotally supported by an arm 114 attached to a leg 22 and extends around the collar 111. The brake 113 is split and provided with ears 116 which are disposed on opposite sides of the cam 109 in such manner that actuation of the solenoid produces rotation of the cam 109 which separates the ears 116 thus releasing the brake from the collar 111 and the lead screw 54 thereby permitting the motor 56 to rotate the lead screw. The motor 56 is preferably adapted for rotation in either direction, it being obvious that as rotation in either direction is stopped, the solenoid 107 will be released by interruption of the circuit to the motor, permitting the brake 113 to spring into engagement with the collar 111 thus immediately stopping rotation of the lead screw 54. The position of the screw 112 is adapted to permit slipping of the lead screw 54 in the collar 111 if rotation of the lead screw is for any reason prevented while the motor is operating.

A suitable steady rest 117 is mounted on the inner rails 21 and provided with an opening through which the lead screw 54 extends. The steady rest 117 is disposed between the collar 111 and the movable gear box 82 and is provided with towing chains 118 secured to the movable gear box and to a leg 22.

The inner connecting member 49 of the copy holder 43 is provided with an integrally formed downwardly extending tongue 119 which is provided with suitably sized vertically aligned openings 121 through which the lead screw 54, the upper movable variable screw 104, and the lower movable variable screw 101 extend. A retractable follower pin 122 extends through a suitable opening in the tongue 119 for engagement with the upper movable variable screw 104 and a similar retractable follower pin 123 extends inwardly from the side of the tongue 119 for engagement with the threads on the lower movable variable screw 101. As best seen in Figures 11 and 12, the follower pins 122 and 123 include a stem 124 extending through an opening in a boss 126 formed in the tongue 119, or other similar member. A pin 127 extends through the stem 124 and is disposed to support the pin 123 in raised or disengaged position by engagement with the face of the boss 126. The boss 126, however, is provided with a slot adapted to receive the pin 127 which lowers the stem 124 a sufficient distance to permit the pin to engage the threads of the screw. A spring is disposed within a counterbore in the boss 126 and engages a collar 131 on the stem 124. A tapered point 132 extends outwardly from the collar 131 and projects a short distance beyond the counterbore when the pin 127 is in the slot 128. The taper on the point 132 corresponds to the taper or face angle of the threads formed on the screw 101 and therefore engages these threads smoothly even after considerable wear has occurred. The length of the counterbore is sufficient to accommodate both the spring 129 and the collar 131 which is of substantial length and cooperates with the bearing between the stem 124 and the boss 126 to prevent any side play or wobble in the follower. Other subsequently described follower pins are of similar structure.

Arms 133 parallel to the inner tracks 21 are secured to the movable gear box 82 and extend inwardly therefrom below the carrier of the copy holder 43 to a point immediately below the outer transverse connecting member 34 of the lens carrier 28 when the lens carrier and the copy holder are in starting position. Suitable connecting means such as captive screws 134 extend through the outer transverse member 34 into engagement with corresponding openings formed in the arms 133. A movable support member 136 is fastened to the bottom of the arms 133 and has formed therein a journal through which the lead screw 54 extends. Suitable bearings 137 are also positioned in the support member 136 in which the ends of the upper and lower movable variable screws 104 and 101 are journaled. The support member 136 is provided with wheels 138 engaging the inner tracks 21 on which it rides.

A steady rest 139, disposed between the fixed support 78 and the movable support 136, includes a transverse bar 141 having wheels 142 engaging the inner tracks 21. The transverse bar 141 is provided with an opening 143 through which the lead screw 54 is journaled. Towing chains 144 connect the steady rest 139 to the fixed support 78 and to the movable support 136 and serve to move the steady rest along the lead screw 54 after the movable gear box 82 has moved outwardly a predetermined distance.

A movable tongue 146 having aligned vertical openings through which the lead screw 54 and the upper and lower fixed variable screws 63 and 71 extend is disposed below the outer transverse member 34 of the lens carrier 28 and is provided with openings to receive captive screws 147 extending through transverse member 34 thus providing means for securing the lens carrier to the movable tongue. A retractable follower pin 148 is disposed on the side of the movable tongue 146 for engagement with the lower fixed variable screw 71. A boss 149 extends outwardly from the outer face of the movable tongue 146 and is semi-cylindrical in shape, extending over the top of the fixed support 78 when in starting position. A retractable follower pin extends through the boss 149 for engagement with the upper fixed variable screw 63. The captive screws 147 are illustrated in Figure 13 and may include a stem 152 having an enlarged head 153 on one end and enlarged threaded point 154 on the opposite end. A threaded opening is provided in the member 34, or other similar members, through which the stem 52 extends and a spring 156 is interposed between the member 34 and the head 153 urging the screw upwardly. Thus the screw 147 is held in raised position except when forced downwardly by hand against the pressure of the spring and engaged with a suitably threaded opening in a member such as a boss 149.

In constructing my camera, it is necessary to consider the types of lenses which will be employed. For example, it may be desired to construct a camera which can interchangeably employ lenses having focal lengths of 60 cm., 9", 12" and 17". In such case, the upper variable screws 63 and 104 are employed for movement of the 60 cm. or longest focal length lens. Each of the lower variable screws 71 and 101 are provided with three separate and distinct variable pitch threads, as for example a thread 157 for 9" focal length lens, a thread 158 for the 12" lens, and a thread 159 for the 17" lens. Mounting openings for the lens carrier 28 are also provided in the arms 133 for the 17", 12" and 9" focal length lenses, as indicated at 161, 162 and 163, respectively.

It should be understood, of course, that various pitches of thread and ratios of gear reduction may be employed in constructing my camera, it being necessary only that the movement of the lens and the copy holder be such as to maintain at all times the desired spacing between the camera elements. It is, however, desirable that the gear reduction to the lower variable screws 101 and 71 be greater than the gear reduction to the upper variable gears 101 and 63 in order that several separate sets of threads may be formed on the same screw. The lead screw 54 may, for example, be provided with a right-hand thread having a pitch of 1.125" and the gear reduction to the upper variable screws 104 and 63 be 3–1, the gear reduction to the lower variable screws 101 and 71 be 48–1, and the gear reduction through the gear 72 in the fixed gear box 63 to the dial 77 be 9–8. Once these gear ratios have been fixed in their proper relationship, it is obvious that the proper variable pitch of the various threads employed on variable screws 63, 71, 101 and 104 may be accurately calculated.

Assuming that a 60 cm. lens is employed and that a photograph or other image has been attached to the board 51 of the copy holder 43 and that it is desired to reduce the size of the copy or image on a negative in the negative holder 23, the following sequence of operations will occur:

The lens carrier is disconnected from the arms 133 by releasing captive screws or pins 134. Captive screws 147 are employed to attach the lens carrier 28 to the movable tongue 146 and the follower pin 151 released to engage the threads on the upper fixed variable screw 63. The follower pin 148 is maintained in disengaged position and is employed only when the 9", 12" or 17" focal length lenses are employed. Similarly the follower pin 123 on the tongue 119 is disengaged and the follower pin 122 engaged with the threads on the upper movable variable screw 104. The copy holder is moved to the position indicated for the 60 cm. lens. The lens and copy holder will then be disposed in starting position with the distance from the center of the lens 39 to the image plane on a negative in the negative holder 23 equal to twice the focal length of the lens 39. The distance from the lens 39 to the surface of the copy on the board 51 will also be twice the focal length of the lens 39.

One of the motor control buttons 106 is pressed, causing the motor 56 to rotate the lead screw 54 in one direction, say counterclockwise when viewed from the negative holder. Rotation of the lead screw 54 moves the movable gear box 82 outwardly away from the negative holder along the lead screw at a linear rate and through the gears 102 and 103 produces rotation of the upper movable variable screw 104 in an opposite direction. Since the copy holder 43 is engaged to the upper movable variable screw 104, it is obvious that the copy holder 43 will also move outwardly but at a non-linear rate less than that of the gear box rate. The initial portion of the movement of the copy holder 43 from starting position with respect to the movable gear box 82 is relatively great since the pitch of the variable screw 104 is greatest at this point and successively becomes less as the end of the thread on the screw 104 is approached. Simultaneously with this movement, however, the lens carrier 28 is moved toward the negative at a non-linear rate since rotation of the lead screw 54 also produces rotation of the upper fixed variable screw 63 in the opposite direction and the follower pin 151 connects the lens carrier to the variable screw 63. It should be noted that the pitch of the threads on the screw 63 is greatest near the end opposite the fixed gear box 53 and that the pitch successively diminishes as it approaches the negative holder 23. The variable pitch of the screws 63 and 104 having been properly calculated and equal, it may be seen that the image of the copy produced by the lens 39 on a negative in the negative holder 23 will at all times be in focus and that the movement may be stopped at any time by release of the button 105. It may also be seen that since the pitch of the threads on variable screws 104 and 63 is identical, the rate of movement between the copy holder 43 and the lens carrier 28 during reduction will be linear, but the rate of movement of the lens carrier 28 relative to the negative holder will be non-linear. The proper size of reduction can be determined either by viewing the image on a ground glass sheet disposed in the negative holder for this purpose or by the counter 74 and dial 77 which can be graduated in any convenient manner.

If it is next desired to make an enlargement of the copy on the copy holder 43, the direction of rotation of the motor 56 is reversed and the lens carrier 28 and copy holder 43 are returned to starting position. Captive screws 147 are unscrewed to release the lens carrier from the movable tongue 146 and the follower pin 151 raised to disengage the carrier from the upper fixed variable screw 63. Captive screws or pins 134 are lowered thus fastening the lens carrier 28 to the arms 133. No adjustment is required for the copy holder 43.

With the parts set as described, rotation of the lead screw will draw the lens carrier 28 outwardly with the movable gear box 82 to which it is now connected by the arms 133 and its rate of movement is therefore linear, controlled directly by the pitch of the lead screw 54. However, the copy holder 43, still being engaged to the upper movable variable screw 104, approaches the lens 39 at a non-linear rate as the lens carrier 28 moves outwardly, thus maintaining the desired relationship of distances between the copy holder 43, the lens 39, and the negative holder 23. Since the overall length of the lead screw 54 is considerable, I prefer to employ the motor 56 for most movements and am enabled to do so without difficulty due to the action of the brake 113. It is obvious, however, that hand wheel 59 may be employed if desired.

Assuming a 60 cm. lens has been in use and it is desired to employ say a 17″ lens for reduction, the lens carrier is disengaged from the arms 133 by pins or screws 134, secured to tongue 146 by screws 147 and moved toward the negative holder 23 until follower pin 148 engages thread 159 on lower fixed variable screw 71. The copy holder 43 is also moved by disengaging follower pin 122 and moving the copy holder until follower pin 123 engages thread 159 on the lower movable variable screw 101, after which the operation proceeds as previously described. For enlargement with a 17″ lens, the lens carrier 28 is moved toward the copy holder 43 until pins 134 engage openings 162 in arms 133, the follower pin 123 remaining engaged with threads 159. Similar adjustments are made for lenses of other focal lengths.

Usually only the lens of longest focal length, as the 60 cm. lens in the above example, is employed in making enlargements or reductions approaching a 1:1 ratio and this lens is therefore the only one which may be placed in starting or 1:1 position. Other lenses are intended for use in obtaining greater enlargement or reduction as for example:

| Focal length of lens | Reduction Ratio | Enlargement Ratio |
| --- | --- | --- |
| 60 cm | 1:1/5 | 1:5 |
| 17 inches | 1/3:1/10 | 3:10 |
| 12 inches | 1/4:1/14 | 4:14 |
| 9 inches | 1/7:1/20 | 7:20 |

In the foregoing specification I have described a preferred form of my structure in detail as required by R. S. 4888, but it is not to be understood that I wish to limit myself to the specific details herein described since it is obvious that many substitutions and modifications can be made in the described structure by those skilled in the art. For example, it is obviously feasible to substitute a rack for the lead screw 54 and provide suitable gearing in the moving gear box 82 to produce the desired operation of the parts. In such instance, means must be provided for translating the movement of a pinion in the gear box 82 to the fixed gear box 53 in order to produce the proper rotation of screws 71 and 63. If the camera is to be used only for enlargement, it is unnecessary, of course, to provide much of the apparatus such as the variable screw 63 and some of the associated mechanism, since these are employed only in making reductions. Various relationships of gears within the gear boxes 53 and 82 as well as the type of gears employed may be varied without departing from the scope of my invention, as may other of the mechanical details herein described, such as the substitution of rods for track. Furthermore, I may provide means for interchanging sets of variable screws, thus eliminating the lower variable screws 71 and 101. I do not therefore wish to limit myself specifically to the form of my invention described herein except in so far as defined by the appended claims.

I claim:

1. In a camera having a fixed negative holder, a lens carrier and a copy holder movable axially on track, and a constant pitch lead screw, the combination therewith of means movable axially by said constant pitch screw, a variable pitch screw carried by said means, means for rotating said screws in fixed relation, and means for driving the copy holder by the variable pitch screw.

2. In a camera having a fixed negative holder, a lens carrier and a copy holder movable on track, and a constant pitch lead screw, the combination therewith of means movable axially by said screw, a variable pitch screw carried by said means, a second variable pitch screw in axial alignment with said first mentioned variable pitch screw and rotatably mounted in fixed relation relative to the negative holder, gears connecting said variable pitch screws with the lead screw, means for driving the copy holder by the first mentioned variable screw, means for driving the lens carrier by the lead screw for movement away from the negative holder, and means for driving the lens carrier by the second mentioned variable screw for movement toward the negative holder.

3. In a camera having a fixed negative holder, a lens carrier and a copy holder, the combination therewith of a constant pitch lead screw, a fixed gear box, a movable gear box driven by the lead screw, a plurality of axially aligned variable pitch screws journaled in said gear boxes, driving means connecting the variable pitch screws with the constant pitch lead screw, means for driving the copy holder by one of the pair of variable screws on the movable gear box, means for driving the lens carrier by the constant pitch lead screw for movement in one direction, and means for driving the lens carrier by one of said variable pitch screws journaled in the fixed gear box for movement in the other direction.

4. In a camera, a pair of tracks, a negative holder normal to the tracks, a first gear box fixed with respect to the tracks, a second gear box movable on the tracks, a constant pitch lead screw connecting the gear boxes, a pair of variable pitch screws on each gear box, means rotatably connecting the variable pitch screws with the lead screw, means supporting the ends of the variable pitch screws, a copy holder on the tracks connectable to one of the variable pitch screws on the second gear box, and a lens carrier on the tracks connectable to one of the variable pitch screws on the first gear box.

5. A focusing device for a camera having a negative holder, a movable lens carrier and a movable copy holder, comprising a constant pitch lead screw having a keyway, a movable gear box on the lead screw, thread-engaging means on the gear box for engaging the lead screw, a variable pitch screw journaled in the gear box, a gear within the gear box secured to the variable pitch screw, a mating gear on the lead screw having a key engaging said keyway, and means for operatively engaging the copy holder with the variable pitch screw.

6. In a camera, a track, a fixed negative holder normal to the track, a lens carrier on the track, a copy holder on the track, said lens carrier being adapted to receive interchangeably a plurality of lenses having different focal lengths, a constant pitch lead screw, a movable gear box on the tracks engaging the lead screw, a plurality of variable pitch screws journaled on the movable gear box each having different pitch threads, means for driving the variable pitch screws in coordination with the lead screw, means for engaging the copy holder with one of the variable pitch screws when one lens is used, and means for engaging the copy holder with another of said variable pitch screws when another lens is used.

7. In a camera, a track, a fixed negative holder normal to the track, a lens carrier and a copy holder movable along the track, a constant pitch lead screw, a movable gear box on the tracks operatively engaging the lead screw, a fixed gear box, a first variable pitch screw journaled in the movable gear box, a second variable pitch screw journaled in the fixed gear box and in axial alignment with the first variable pitch screw, means for rotating both variable pitch screws in fixed relation to the lead screw, means for engaging the copy holder to one of the variable pitch screws, and means for engaging the lens carrier to the other of the variable pitch screws, the pitch of the threads on each of the variable screws being similar.

8. In a device of the kind described, the combination of a stationary negative holder, a movable copy holder and a movable lens positioned between said holder, said lens and copy holder being movable along a common optical axis with respect to said negative holder, a movable element, a constant pitch screw operatively connected to said element, for moving the latter in a direction away from said negative holder at a predetermined linear rate, a variable pitch screw carried by and axially movable with said element for moving said copy holder towards said element at a predetermined non-linear rate, a second like variable pitch screw axially stationary with respect to said negative holder and adapted to be operatively connected to said lens for moving the latter toward said negative holder at a non-linear rate equal to the non-linear movement of said copy holder, driving means for rotating the respective screws, and means for selectively operatively connecting said lens holder to either said second variable pitch screw or to said element, the relation between said screws and driving means therefore for moving said element, lens and copy holder being such that said negative holder is in continuous photographic focus with respect to said copy holder and lens.

MEYER DAVIS.

REFERENCES CITED

The following references are of record in the file of this patent:

UNITED STATES PATENTS

| Number | Name | Date |
|---|---|---|
| 730,583 | Stender | June 9, 1903 |
| 1,174,547 | Clason | Mar. 7, 1916 |
| 1,649,646 | Badgley | Nov. 15, 1927 |

FOREIGN PATENTS

| Number | Country | Date |
|---|---|---|
| 195,965 | Great Britain | Mar. 13, 1924 |
| 823,040 | France | Oct. 4, 1937 |